Feb. 27, 1951 E. C. IWANOWSKI 2,543,724
BATTERY FILLING MEANS
Filed July 25, 1949
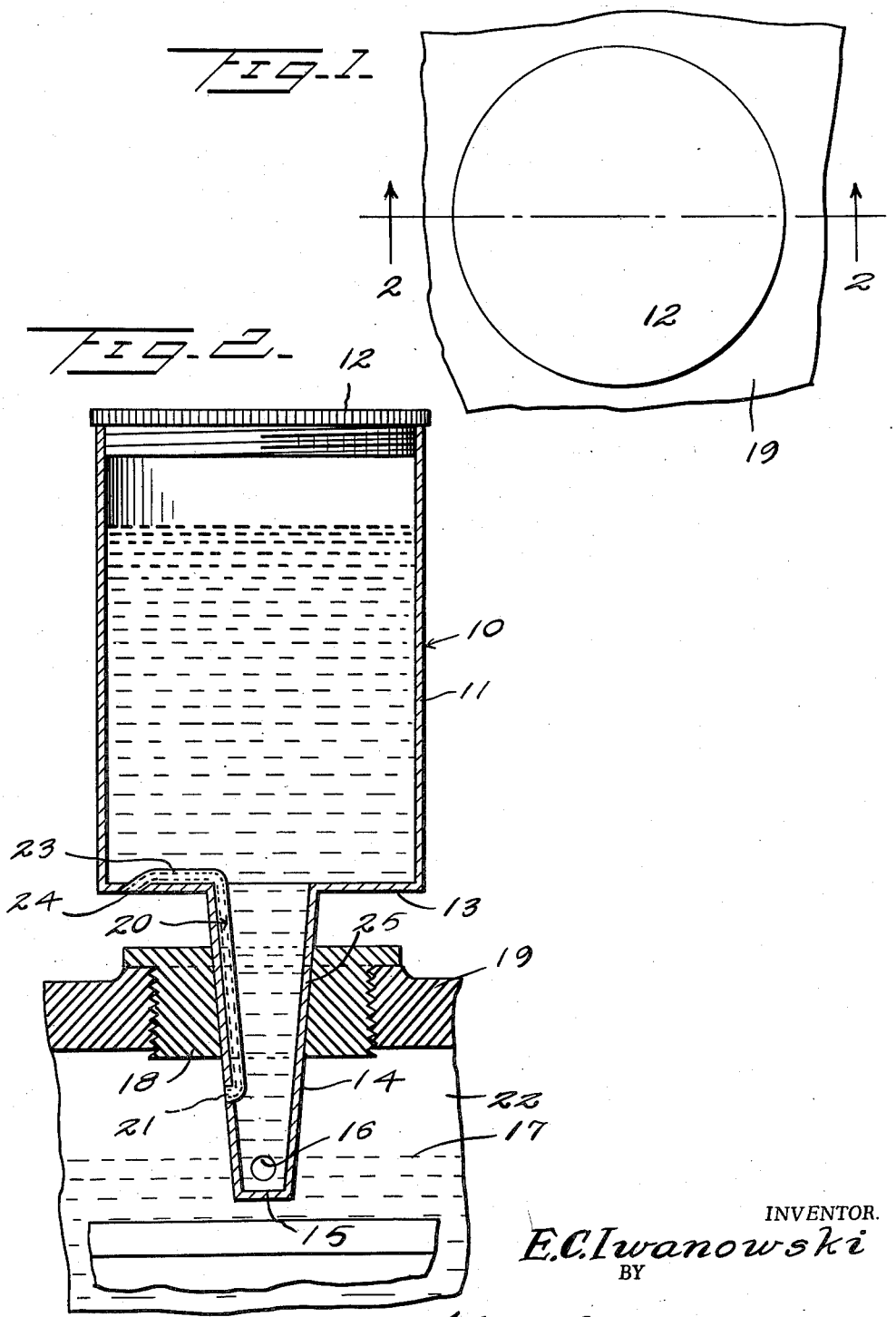
INVENTOR.
E. C. Iwanowski
BY
Kimmel & Crowell ATTORNEYS Patented Feb. 27, 1951

2,543,724

UNITED STATES PATENT OFFICE 2,543,724

BATTERY FILLING MEANS

Edgar C. Iwanowski, Jacksonville, Fla.

Application July 25, 1949, Serial No. 106,668

2 Claims. (Cl. 136—162)

This invention relates to a battery filling means.

An object of this invention is to provide a device whereby the liquid level in a battery cell may be maintained at all times.

Another object of this invention is to provide a fountain supply means for a battery cell whereby the liquid level will be automatically maintained.

A further object of this invention is to provide a device of this kind for mounting in a battery cell cap, or on the upper cell plate on the battery, which includes a transparent reservoir so that the available water supply will be visible from above the battery.

With the above and other objects in view, my invention consists in the arrangement, combination and details of construction disclosed in the drawing and specification, and then more particularly pointed out in the appended claims.

In the drawing,

Figure 1 is a plan view of a battery filling means constructed according to an embodiment of this invention.

Figure 2 is a section view taken on the line 2—2 of Figure 1.

Referring to the drawing, the numeral 10 designates generally a reservoir or housing which is formed of a cylindrical side wall 11, a cap or closure 12 at the upper end of the side wall 11, and a bottom wall 13 at the lower end of the side wall 11. The cap 12 may be threaded or otherwise secured to the top of the side wall 11 so that water may be discharged into the reservoir or housing 10. Preferably the housing 10 is of transparent characteristic so that the level of water within the housing or reservoir is readily visible from the exterior.

The bottom wall 13 has extending downwardly from the axial center thereof a tube 14 which in the present instance tapers downwardly and is provided at its lower end with an end wall 15. The tube 14 is formed with one or more outlet openings 16 which are positioned above the bottom 15 so that water can gravitatingly flow into the interior of a battery cell to substantially the level indicated at 17. The tube 14 extends through and is fixed centrally in a threaded cap 18 which is threaded through the top wall 19 of a battery cell.

A vent tube 20 is disposed within the tube 14, extending lengthwise thereof and is formed at its lower end with an outwardly bent extension 21 which extends through the tube 14 and communicates with the space 22 above the battery fluid level 17. The vent tube 20 at its upper portion is provided with a laterally extending extension 23 which extends along the upper or inner side of the bottom wall 13 and is extended as indicated at 24, through the bottom wall 13. The tube 20 provides a means of communicating the space 22 with the atmosphere and prevents the leakage of water or battery fluid from the tube 14 and from the battery.

In the use of this device, the cap 18 is formed with a tapered opening 25 within which the tapered tube 14 is adapted to be firmly fixed. The housing or reservoir 10 is filled with water to the desired level and when the cap 18 is threaded into the cell wall 19, or applied to the especially designed upper cell plate, the liquid level 17 in the battery cell will be maintained so long as there is any water in the reservoir 10 and within the tube 14.

With a battery filling device as hereinbefore described, each cell may be provided with a separate water reservoir so that the water will gravitatingly flow into the cell to maintain the proper liquid level within the cell. By providing the housing or reservoir of transparent characteristic, the water level within the reservoir or housing 10 is readily visible so that this water level can be maintained at a predetermined height without removing the device from the top of the battery.

I do not mean to confine myself to the exact details of construction herein disclosed, but claim all variations falling within the purview of the appended claims.

What I claim is:

1. A battery filling means comprising a cylindrical housing adapted to receive water, having a transparent cylindrical side wall, a cap on the upper end of said side wall, a bottom wall secured to the lower end of said side wall, a tapered tube extending downwardly from said bottom wall having a closed lower end and an outlet and filling opening above said lower end, a battery cap having a tapered aperture therein surrounding and fixed to said tube between the ends of the latter, having vent tube extending lengthwise along the interior of the side wall of said first named tube and formed at its upper end with a bend overlying said bottom wall, the lower end of said vent tube extending through said first named tapered tube between said opening, and said battery cap and the upper end of said vent tube extending through said bottom wall whereby the air space above the battery liquid will be in communication with the atmosphere.

2. A storage battery venting and electrolyte level regulating device for a storage battery having a tapered top opening of downwardly decreasing internal cross section, said device comprising a closed top, upstanding liquid container having a bottom wall, a tapered flow control tube of downwardly decreasing external cross section depending from said bottom wall, said tube having a closed lower end and being perforated at a portion adjacent said end thereby to provide an outlet for liquid from said container into said battery to maintain the electrolyte level therein at said perforated portion, a vent tube having a lower portion extending longitudinally within and along a side of said first tube and an upper portion extending into said container and being bent therein to overlie said bottom wall, said tube having an upper and a lower open end, said upper vent tube end extending through said bottom wall to open downwardly to the atmosphere outside said battery and said lower vent tube end extending through said first tube appreciably above said perforated portion thereof to open into the space within said battery above the electrolyte level maintained therein, said vent tube ends being sealed through said bottom wall and said first tube, respectively, against the passage of liquid about said ends.

EDGAR C. IWANOWSKI.

REFERENCES CITED

The following references are of record in the file of this patent:

UNITED STATES PATENTS

| Number | Name | Date |
|---|---|---|
| 2,339,642 | Le Gro et al. | Jan. 18, 1944 |
| 2,471,094 | Christen | May 24, 1949 |

FOREIGN PATENTS

| Number | Country | Date |
|---|---|---|
| 320,026 | Great Britain | Sept. 30, 1929 |
| 551,867 | Great Britain | Mar. 12, 1943 |